(12) United States Patent
Abdeljawad

(10) Patent No.: US 7,004,245 B2
(45) Date of Patent: Feb. 28, 2006

(54) SYSTEM FOR AIDING IN PREVENTION OF ENGINE OVERHEATING IN A VEHICLE

(76) Inventor: Adel A. Abdeljawad, 6560 Deermeadows Dr., Huber Heights, OH (US) 45424

(*) Notice: Subject to any disclaimer, the term of this patent is extended or adjusted under 35 U.S.C. 154(b) by 338 days.

(21) Appl. No.: 10/686,273

(22) Filed: Oct. 15, 2003

(65) Prior Publication Data
US 2005/0082052 A1    Apr. 21, 2005

(51) Int. Cl.
*B60H 1/00* (2006.01)

(52) U.S. Cl. .................. 165/203; 165/43; 165/103; 237/12.3 A; 62/243

(58) Field of Classification Search ............ 165/41–44, 165/202–204, 103; 237/12.3 R, 12.3 A; 62/243, 239; 219/202
See application file for complete search history.

(56) References Cited

U.S. PATENT DOCUMENTS

| 4,459,466 A | * | 7/1984 | Nakagawa et al. ......... 165/103 |
| 5,172,656 A | | 12/1992 | Wright |
| 5,505,251 A | * | 4/1996 | Sarbach ...................... 165/202 |
| 5,571,432 A | * | 11/1996 | Sarbach ...................... 219/202 |
| 6,786,060 B1 | * | 9/2004 | Alber et al. ................. 165/42 |

* cited by examiner

*Primary Examiner*—Ljiljana Ciric
(74) *Attorney, Agent, or Firm*—R. William Graham

(57) ABSTRACT

A system for aiding an engine in a vehicle includes an air duct operably disposed in the vehicle having a fresh air inlet for receiving fresh air, first outlet for exhausting air outside the vehicle, and second outlet for exhausting air inside a passenger compartment, a cool air conditioning device operably disposed in the duct to cool air as it passes thereby when in an "on mode", a heater core operably disposed in the duct to continuously provide heat air as it passes thereby and remove heat from the engine. A first diverter is operably disposed in the duct for continuously diverting at least some of the heated air toward the first outlet when the cool air conditioning device is in an "on mode" and a second diverter is operably disposed in the duct for continuously diverting at least one fresh air or cool air toward one of the outlets.

11 Claims, 3 Drawing Sheets

SYSTEM FOR AIDING IN PREVENTION OF ENGINE OVERHEATING IN A VEHICLE

FIELD OF THE INVENTION

This invention relates to vehicle heating and cooling devices. More particularly, the invention relates to a system for aiding in preventing vehicle engine overheating.

BACKGROUND OF THE INVENTION

The temperature of a liquid cooled internal combustion engine is typically controlled by a liquid coolant circulated through the engine and a radiator. Currently, an attempt to control engine temperature is done through a system for controlling the temperature of the liquid coolant, typically by controlling the rate at which it circulates. Such systems are not sufficient when operating under extreme hot or cold conditions, i.e., the liquid coolant may be too cold or get too hot. If the coolant is too cold, the engine may run rough or stall and if the coolant is too hot, the engine may overheat and be damaged. Overheating can occur on very hot summer days or when the motor vehicle is driven hard or in heavy traffic necessitating frequent stops and starts. Overheating is also likely when the air conditioner is running adding additional load on the engine. Overcooling can occur under extremely cold driving conditions.

As previously taught, liquid cooled engines can be cooled by running the heater in the passenger compartment, wherein the heat generated by the heater comes from the coolant, a portion of which is routed through a heater core for warming the passenger compartment. This reduces the temperature of the circulating liquid coolant in hot weather at the expense of the passengers' comfort, particularly in hot summer conditions. An attempt to provide an alternative cooling of the engine has been to direct some of the artificially cooled air back at the radiator.

There exist other aftermarket products for heating or cooling a liquid cooled engine. There are electrical heaters for heating the coolant and devices for cooling the radiator. There is a system for directing a side stream of air from a cool air conditioner onto the radiator and another system for directing a stream of heated or cooled air from an auxiliary air tempering unit onto the radiator. While there has been some improvement in the field, there remains a need to improve heating/cooling systems in liquid cooled engines.

SUMMARY OF THE INVENTION

It is an object of the present invention to provide a device for aiding in the prevention of automobile engine overheating.

It is another object to prevent overheating in an internal combustion engine making use of conventional heating/cooling systems normally found on motor vehicles.

Other objects and features of the invention will be apparent from the disclosure and the claims hereinafter.

An embodiment is directed to a system for aiding in prevention of engine overheating in a vehicle, wherein liquid coolant is circulated between the engine where it picks up heat and a radiator where it surrenders its heat as it flows through the radiator with a portion of the liquid coolant routed to a heater core where it further surrenders heat. The system includes an air duct system operably disposed in the vehicle having a fresh air inlet for receiving fresh air, first outlet for exhausting air outside the vehicle, and a second outlet for exhausting air inside a passenger compartment of the vehicle. A cool air conditioning device is operably disposed in the duct system to cool air as it passes thereby when in an "on mode." A heater core is operably disposed in relation to the duct system to continuously provide heat to the duct system and to heat air as it passes through the duct system and remove heat from the engine. A first diverter is operably interposed in the duct system for continuously diverting at least some of the heated air toward the first outlet when the cool air conditioning device is the "on mode." A second diverter is operably disposed in the duct system for continuously diverting at least one of fresh air and cool air toward one of the outlets.

The duct system includes a third outlet for exhausting air onto the engine. A third diverter is operably disposed in the duct system for continuously diverting at least one of fresh air, heated air and cooled air toward either the first outlet or the third outlet.

The invention as summarized above is more completely understood by the description and drawings which follow.

BRIEF DESCRIPTION OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1A:
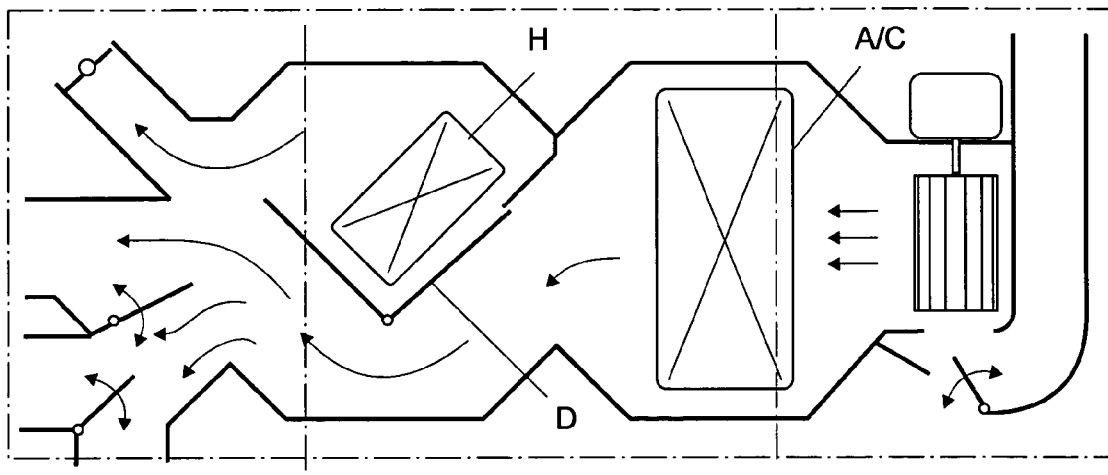
FIG. 1A is a schematic depicting air flow through a prior art system in one mode.

Referring to the drawings, the system for aiding in preventing automobile engine overheating is generally referred to by the reference numeral 100. Prior art is shown in FIGS. 1A–1C which depict various modes, wherein FIG.1 A indicates a heater core in "off mode" and cool air conditioner in "on mode" with a vent open only to permit cool air flow only to the passenger compartment, FIG. 1B indicates a heater core in "on mode" and cool air conditioner in "off mode" to provide heat with vent open only to permit hot air to the passenger compartment and FIG. 1C indicates a heater core in an "off mode" and cool air conditioner "on mode" with the vents open to permit cool air back to the engine and to a passenger compartment.

As a preface to discussing the invention, it is helpful to provide some description of a common internal combustion engine in an automobile having a liquid cooling system. Liquid coolant is circulated through a radiator and through passages in an engine block, where it picks up heat. The heated coolant exits engine and enters the top of the radiator, where it is ideally cooled. A fan on the engine helps dissipate the coolant's heat. In the case of enabling the automobile heater, some of the coolant warmed by the engine passes through a heater core for warming the passenger compartment. The automobile is also preferably operably equipped with an air conditioning (a/c) condensing device.

Figure 1B:
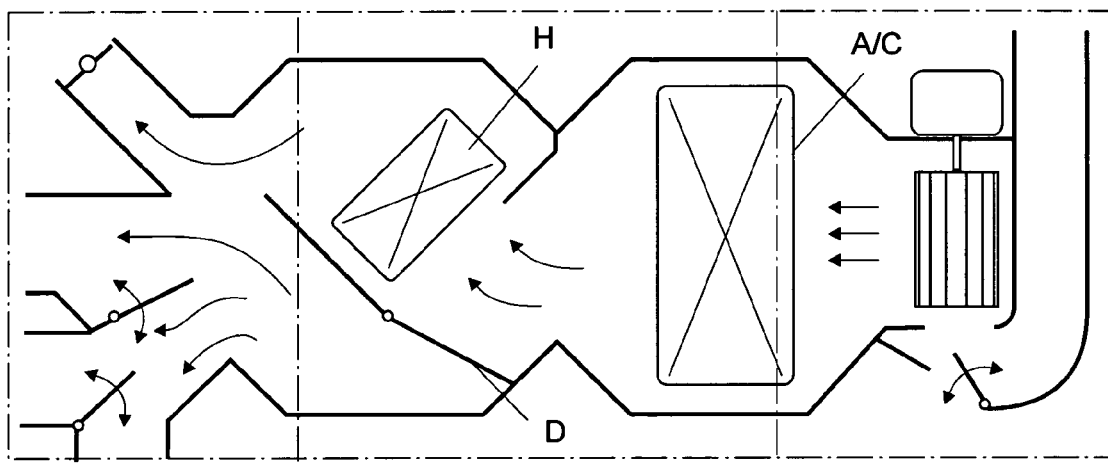
FIG. 1B is a schematic depicting air flow through a prior art system in another mode.
Figure 1C:
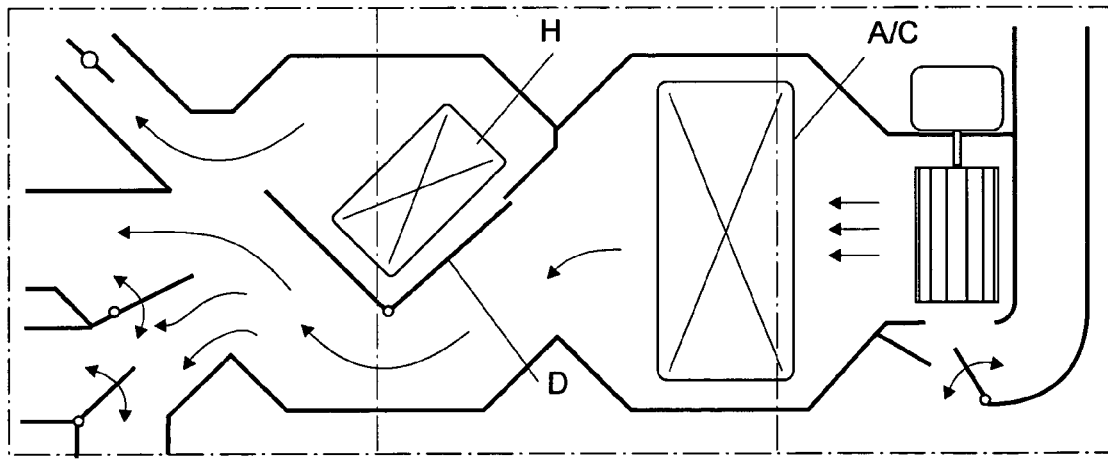
FIG. 1C is a schematic depicting air flow through a prior art system in yet one more mode.

As seen in FIGS. 1A–1C, the prior system provided for diversion of cool air back onto the radiator when a heater core door D was closed and the a/c device A/C was in "on mode" and heater H in "off mode". This system did not provide an adequate solution to fully maximize the cooling of the engine during hot weather.

Figure 2A:
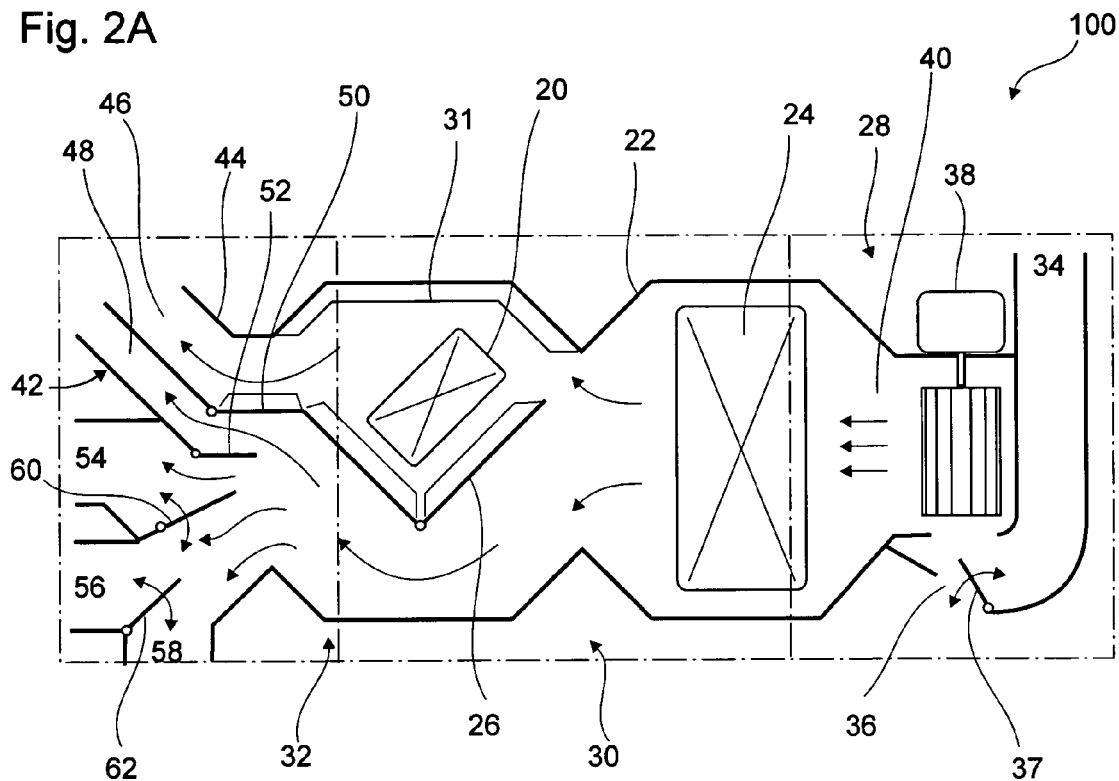
FIG. 2A is a schematic depicting air flow through a system of the present invention in a hot weather mode of operation.
Figure 2B:
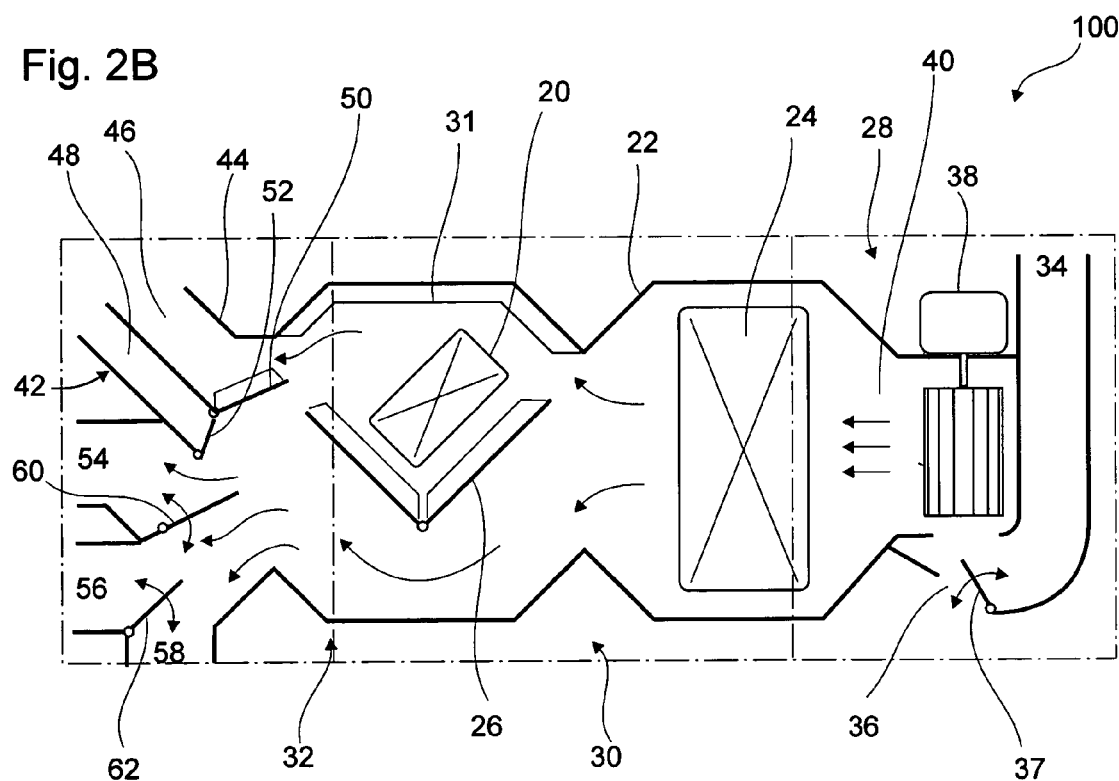
FIG. 2B is a schematic depicting air flow through a system of the present invention in another hot weather mode of operation.
Figure 3A:
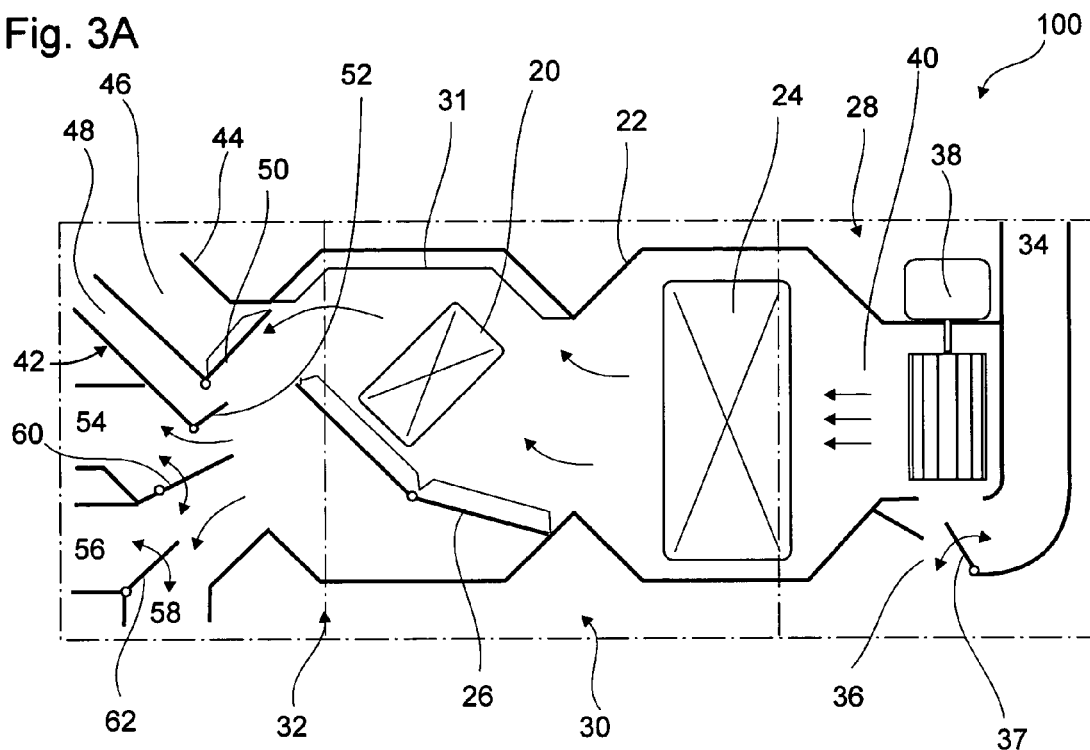
FIG. 3A is a schematic depicting air flow through a system of the present invention in a first cold weather mode of operation.
Figure 3B:
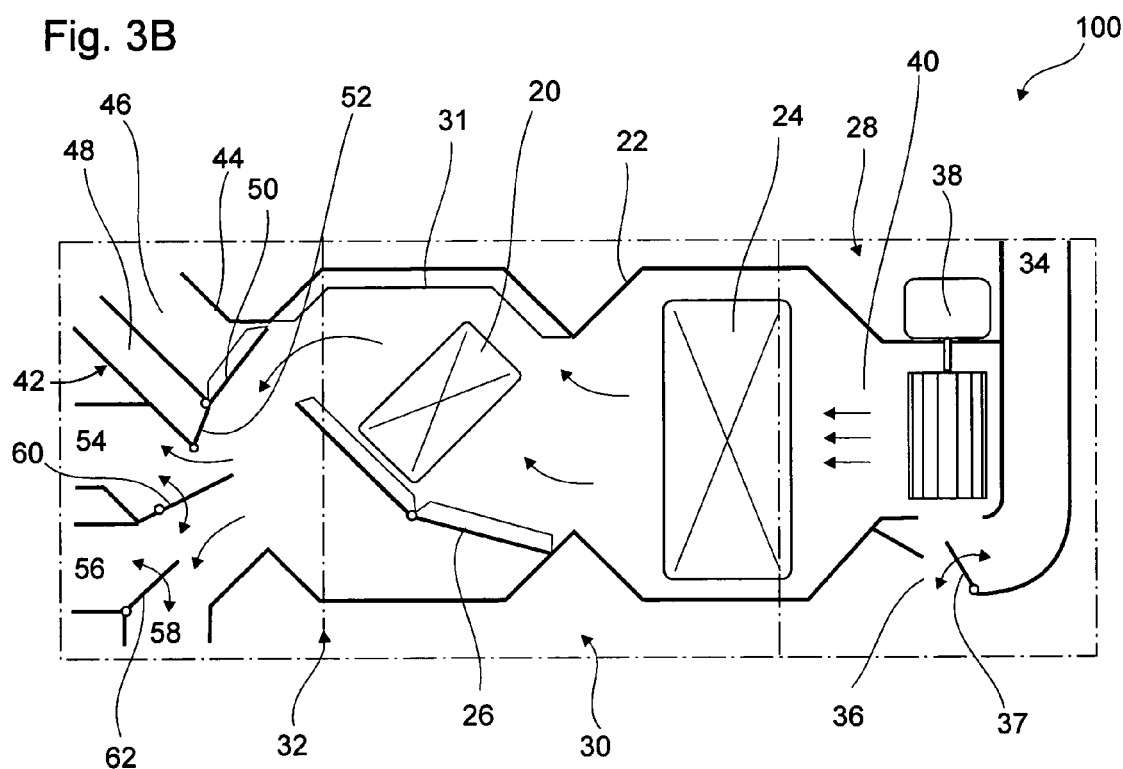
FIG. 3B is a schematic depicting air flow through a system of the present invention in a second cold weather mode of operation.

An improved case/duct system 22 is provided which is operably configured to receive hot air from the heater core 20 and cold air from the a/c device 24. In FIGS. 2A–3B, the current system 100 provides for a more complete solution to cooling the engine during hot weather situations which still maintains the inside compartment with cool air. FIG. 2A indicates a heater core 20 in the "on mode" and cool air conditioner 24 in the "on mode" with the vent door 50 open to permit hot air to pass directly outside the vehicle, and vent doors 52, 60 and 62 open to permit cool air back to the engine and to a passenger compartment. FIG. 2B indicates a heater core 20 in the "on mode" and cool air conditioner 24 in "on mode" with vent door 52 closed, vent door 50 part open to permit hot air from the heater core 20 to pass outside the vehicle and a vent doors 60 and 62 open to pass mixed hot air and cool air only to the passenger compartment. FIG. 3A indicates a heater core 20 in the "on mode" and cool air conditioner 24 in "off mode" with vents 26, 52, 60 and 62 open to pass at east part of the heated air back to the engine until the engine is warm as well as to the passenger compartment. FIG. 3B indicates heater core 20 in "on mode" and cool air conditioner 24 in "off mode" with vent doors 26, 60 and 62 open to pass heat only to the passenger compartment. It is contemplated that the vent doors 26, 50, 52, 60 and 62 of the invention can be automatically controlled to open in an amount in accordance with a preselected temperature within the vehicle or as an automated function to warm or cool the engine and passenger compartment as needed. Thus, the partial opening of the vents doors 26, 50, 52, 60 and 62 can result in a blended air temperature.

The case/duct system 22 is divided into an air intake section 28, conditioned air section 30 and an air distribution section 32 in which lies a significant improvement over the art. The air intake section 28 can include of a fresh (outside) air inlet 34, a recirculation (inside) air inlet 36, a fresh-recirculation air door 37, a blower 38 with motor, and an air outlet 40. Fresh air inlet 34 provides the system with a fresh outside air supply and recirculation air inlet 36 provides recirculated in-car air supply. The position of fresh-recirculation air door 37 depends on the system mode.

Conditioned air section 30 is the center section of case/duct system 22 and includes the heater core 20 and cool air device 24. Air flow is from right to left in the illustration. As illustrated in FIGS. 2A–3B, hot engine coolant continuously flows through heater core 20. The heater core 20 is disposed in insulated portion 31 of the section 30. Thus, in the hot weather mode of operation as seen in FIGS. 2A and 2B, the heater core 20, while operating to emit heat and hence draw heat from the engine, does not deleteriously affect the cool air flow which is aimed at reaching the inside passenger compartment. This is accomplished in part through a dual vent mechanism 42 which is disposed adjacent a dual outlet 44 of case/duct system 22. The dual outlet 44 includes separate conduits 46 and 48.

Conduit 46 vents through to outside the automobile thus releasing the emitted hot air into the environment external to the vehicle as opposed to the engine area. Conduit 48 can vent through to exhaust air toward the radiator, e.g., to vent cooled air onto the radiator. An insulated duct door 50 operates to open and close communication with a portion of outlet 44 leading to conduit 46 and likewise duct door 52 operates to open and close communication with another portion of outlet 44 leading to conduit 48. While it is shown that the portion of the case/duct system 22 is insulated, it can be that a remaining portion can be insulated if so desired.

The case/duct system 22 provides for cool outside fresh air to be heated as it passes through heater core 20. In FIG. 3A, the vent door 50 is closed and vent door 52 is open to outlet, thus permitting some heat back to the engine compartment. This aids in quickly warming the engine. Once heated, another winter operational mode as seen in FIG. 3B is used, wherein the air conditioner 24 is in "off mode," the vent doors 50 and 52 are in a closed position with heater core door 26 and vent doors 50 and 52 open such that hot air can pass inside the passenger compartment. It is recognized that a desired temperature level can be achieved by the position of heater core door 26 and duct doors 50, 52, 60 and 62. The invention allows a percentage of the outside air to bypass the heater core 20 to temper the heated air or provide for some of the heated air to pass outside the vehicle through vent door 50. The heated air and cooled air are then blended to provide the desired temperature level before passing to air distribution section 32. The drawings provided are illustrative only and not intended to represent all the various modes which are contemplated by the instant invention.

Heater core door 26 and duct door 50 work together to provide control of airflow either entirely through or partially bypassing the heater core 20. All incoming air is shown to pass through duct system 22. It is in sections 30 and 32 that fill-range temperature conditions are provided for passenger comfort as well as maintaining maximum engine cooling and heating benefit.

In maximum cooling, re-circulated air passes through a/c device 24 and is then directed back into the vehicle. In other than the recirculated air mode, fresh outside air passes through device 24 and is cooled before delivery into the vehicle. Temperature level can be affected by the position of heater core door 26 which allows a percentage of cooled air to pass through heater core 20 to be reheated or by partially opening vent doors 50, 52. The cooled air passing though a/c device 24 and the reheated air passing though heater core 20 can be blended to provide the desired temperature level. This tempered air is then directed through the air distribution section 32 to the passenger compartment to meet a desired passenger temperature output.

Air distribution section 32 directs tempered air to be discharged to floor outlets 54, defrost outlets 56 or dash panel outlets 58. There can be several blend mode doors in air distribution section 32, i.e., H/LO door 60 and DEF/AC door 62.

The case/duct system 22 shown in FIGS. 2A–3B represents no particular manufacturer's design and should be understood in the context that for use in the present invention, it is sufficient that there be a source of tempered air. As will be understood by those skilled in the art, there are many case/duct system designs deemed to be covered by the claims appended hereto. It will be understood that doors described herein may be operated mechanically with a Bowden cable or the like, pneumatically or electrically and be thermostatically controlled automatically.

In hot weather, system 100 can be used to cool engine and in cold weather, it can be used to heat the engine. In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A system for aiding in prevention of engine overheating in a vehicle, wherein liquid coolant is circulated between the engine where it picks up heat and a radiator where it surrenders its heat as it flows through the radiator with a portion of the liquid coolant routed to a heater core where it further surrenders heat, which includes:
   an air duct system operably disposed in the vehicle having a fresh air inlet for receiving fresh air, first outlet means for exhausting air outside the vehicle, and second outlet means for exhausting air inside a passenger compartment of the vehicle;
   a cool air conditioning device operably disposed in said duct system to cool air as it passes thereby when in an "on mode";
   a heater core operably disposed in relation to said duct system to continuously provide heat to said duct system and to heat air as it passes through said duct system and remove heat from said engine;
   first diverter means operably disposed in said duct system for continuously diverting at least some of said heated air toward said first outlet means when said cool air conditioning device is in an "on mode"; and
   second diverter means operably disposed in said duct system for continuously diverting at least one of fresh air and cool air toward one of said outlet means.

2. The system of claim 1, wherein said duct system includes third outlet means for exhausting air onto the engine and a third diverter means operably disposed in said duct system for continuously diverting at least one of fresh air and cool air toward one of said second outlet means and said third outlet means when said cool air conditioning device is in said "on mode".

3. The system of claim 2, wherein at least one said diverter means cooperates to partially open to provide blended air temperature.

4. The system of claim 1, wherein said duct system includes third outlet means for exhausting air onto the engine and a third diverter means operably disposed in said duct system for continuously diverting at least one of fresh air and heated air toward one of said second outlet means and said third outlet means when said cool air conditioning device is in "off mode".

5. The system of claim 4, wherein said first diverter means is equipped to divert heated air toward said second outlet means and said third outlet means when said cool air conditioning device is in an "off mode".

6. The system of claim 4, wherein at least one said diverter means cooperates to partially open to provide blended air temperature.

7. The system of claim 1, wherein said first diverter means is equipped to divert heated air toward said second outlet means when said cool air conditioning device is in an "off mode".

8. The system of claim 1, wherein said first diverter means is equipped to divert heated air toward said first outlet means when said cool air conditioning device is in an "on mode".

9. The system of claim 1, wherein said second diverter means is equipped to divert heated air toward said first outlet means when said cool air conditioning device is in an "on mode".

10. The system of claim 1, wherein said duct system includes an insulated portion to receive said heated air in a manner to maintain said heated air substantially insulated from one of said cooled air and said fresh air.

11. The system of claim 1, wherein at least one said diverter means cooperates to partially open to provide blended air temperature.

* * * * *